US009609281B2

(12) United States Patent
Mariadoss

(10) Patent No.: US 9,609,281 B2
(45) Date of Patent: Mar. 28, 2017

(54) VALIDATING ASSET MOVEMENT USING VIRTUAL TRIPWIRES AND A RFID-ENABLED ASSET MANAGEMENT SYSTEM

(75) Inventor: Pandian Mariadoss, Allen, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1652 days.

(21) Appl. No.: 12/893,180

(22) Filed: Sep. 29, 2010

(65) Prior Publication Data
US 2012/0075475 A1 Mar. 29, 2012

(51) Int. Cl.
H04N 7/18 (2006.01)
G08B 13/196 (2006.01)
G08B 13/24 (2006.01)

(52) U.S. Cl.
CPC ............. *H04N 7/18* (2013.01); *G08B 13/196* (2013.01); *G08B 13/2402* (2013.01)

(58) Field of Classification Search
CPC ........................................................ H04N 7/18
USPC ........................................................ 348/162
See application file for complete search history.

(56) References Cited

U.S. PATENT DOCUMENTS

| 6,998,987 | B2 | 2/2006 | Lin |
| 7,492,262 | B2 | 2/2009 | Washington |
| 2004/0105006 | A1 | 6/2004 | Lazo et al. |
| 2006/0006999 | A1 | 1/2006 | Walczyk et al. |
| 2006/0279630 | A1 | 12/2006 | Aggarwal et al. |
| 2007/0013776 | A1* | 1/2007 | Venetianer et al. .......... 348/143 |
| 2008/0018738 | A1* | 1/2008 | Lipton et al. ................. 348/143 |
| 2009/0160942 | A1* | 6/2009 | Kuo et al. ..................... 348/169 |
| 2010/0026802 | A1 | 2/2010 | Titus et al. |

(Continued)

FOREIGN PATENT DOCUMENTS

CN 201242768 Y 5/2009

OTHER PUBLICATIONS

"Integration of Active RFID and IP Video," [online] Guard RFID Solutions, Inc., [retrieved Jul. 21, 2010] retrieved from the Internet: <http://guardrfid.com/news/46/guard-rfid-integrates-active-rfid-and-ip-video>.

(Continued)

*Primary Examiner* — Christopher S Kelley
*Assistant Examiner* — Jonathan Messmore
(74) *Attorney, Agent, or Firm* — Cuenot, Forsythe & Kim, LLC

(57) ABSTRACT

Validation of asset movement can begin with the definition of a virtual tripwire for video cameras of a video surveillance system that monitor a defined area of interest through which RFID-identified assets are conveyed. The virtual tripwire can visually define a boundary within the view field of the video camera. The video camera can detect the movement of an asset through a virtual tripwire and an asset management system can be notified of the potential misdirection of the asset. The asset management system can obtain the asset's RFID data from a RFID handling system that monitors the area of interest. The validity of the detected movement can be determined using RFID data and an asset movement specification that defines pathing rules for assets and virtual tripwires. When the movement of the asset is determined to be invalid, a record of suspect movement data can be generated for the asset.

19 Claims, 4 Drawing Sheets

(56) References Cited

U.S. PATENT DOCUMENTS

2010/0097221 A1    4/2010    Kreiner et al.
2010/0103173 A1    4/2010    Lee et al.
2010/0148964 A1    6/2010    Broer

OTHER PUBLICATIONS

Lindsay, J., et al., "RFID Locating Systems for Linking Valued Objects with Multimedia Files," [online] IPCom.com, Dec. 23, 2003, retrieved from the Internet: <https://priorart.ip.com/viewPub.jsp?pubID=IPCOM000021113D>.

\* cited by examiner

1

VALIDATING ASSET MOVEMENT USING VIRTUAL TRIPWIRES AND A RFID-ENABLED ASSET MANAGEMENT SYSTEM

BACKGROUND

The present disclosure relates to the field of asset management and, more particularly, to a validating asset movement using virtual tripwires and a radio-frequency identification (RFID) enabled asset management system.

Monitoring the movement of assets through large and/or complex conveyance systems is often a daunting task. The misdirection of assets through these systems requires time and effort to rectify, and even more to determine the cause in order to prevent additional occurrences. In the attempt to reduce asset misdirection, many asset management systems utilize radio-frequency identification (RFID) systems to track asset movements as well as video surveillance systems to create visual records.

Further, some of these asset management systems (those utilizing video surveillance and RFID systems) include notification capabilities when an asset does not follow its route past predefined RFID readers. While helpful, such notifications by the RFID system do not provide an overall picture of the problem. A video record of the problem was captured by the video surveillance system. However, the user must search through the video archive in order to find the feeds from the video cameras associated with the RFID readers that detected the problem and then review these feeds for the appropriate time segment.

Thus, users of these current implementations of asset management systems that utilize video surveillance and RFID systems are required to manually aggregate video data in order to review detected problems. Further, the user must utilize additional tools and/or systems in order to save the aggregated data for future trend analysis tasks.

SUMMARY

One aspect of the present disclosure can include a method for validating asset movement. Such a method can begin with the definition of a virtual tripwire for a video camera of a video surveillance system that monitors a defined area of interest through which assets are conveyed. The virtual tripwire can visually define a boundary within a view field of the video camera. Assets can be identified by an attached radio-frequency identification (RFID) tag. The movement of an asset through a virtual tripwire can be detected by a video camera. This movement of the asset through the virtual tripwire can be considered as a potential misdirection of the asset. An asset management system can be notified of the potential misdirection of the asset. The notification can include the location of the video camera having detected the potential misdirection and the time of the detected movement. The asset management system can obtain RFID data for the asset from a RFID handling system that monitors the area of interest. The validity of the movement of the asset through the virtual tripwire can then be determined based upon the RFID data and an asset movement specification. The asset movement specification can define pathing rules for assets and virtual tripwires. When the movement of the asset is determined to be invalid, a record of suspect movement data can be generated to document the movement of the asset through the virtual tripwire.

Another aspect of the present disclosure can include a system for validating asset movement. Such a system can include RFID-identified assets, a video surveillance system, a RFID handling system, an asset movement specification, and an asset management system. The video surveillance system can include multiple video cameras that monitor a defined area of interest. Each video camera can be capable of having virtual tripwires defined within its view field. The video surveillance system can be configured to detect the movement of an asset through a virtual tripwire. The RFID handling system can include RFID readers configured to capture RFID data from RFID tags that pass through the defined area of interest. The asset movement specification can define pathing rules for the assets and virtual tripwires associated with the video cameras. Assets can be referenced within the asset movement specification using the RFID data contained in their associated RFID tag. The asset management system can be configured to capture suspect movement data for asset movements through the defined area of interest deemed invalid with respect to the asset movement specification. The suspect movement data can include video data of the movement from the video surveillance system and the RFID data of the asset collected by the RFID handling system.

Yet another aspect of the present disclosure can include a computer program product that includes a computer readable storage medium having embedded computer usable program code. The computer usable program code configured to receive notification of the potential misdirection of an asset through a defined area of interest from a video surveillance system. The potential misdirection can represent the movement of the asset through a virtual tripwire associated with a video camera that monitors the defined area of interest. The notification can include the location of the video camera having detected the potential misdirection and the time of the detected movement. The computer usable program code can also be configured to obtain RFID data for the asset from a RFID handling system that monitors the defined area of interest. The computer usable program code can be configured to determine the validity of the movement of the asset through the virtual tripwire based upon the RFID data and an asset movement specification. The asset movement specification can define pathing rules for assets and virtual tripwires. When the movement of the asset is determined to be invalid, the computer usable program code can be configured to generate a record of suspect movement data to document the movement of the asset through the virtual tripwire.

DETAILED DESCRIPTION

Figure 1:
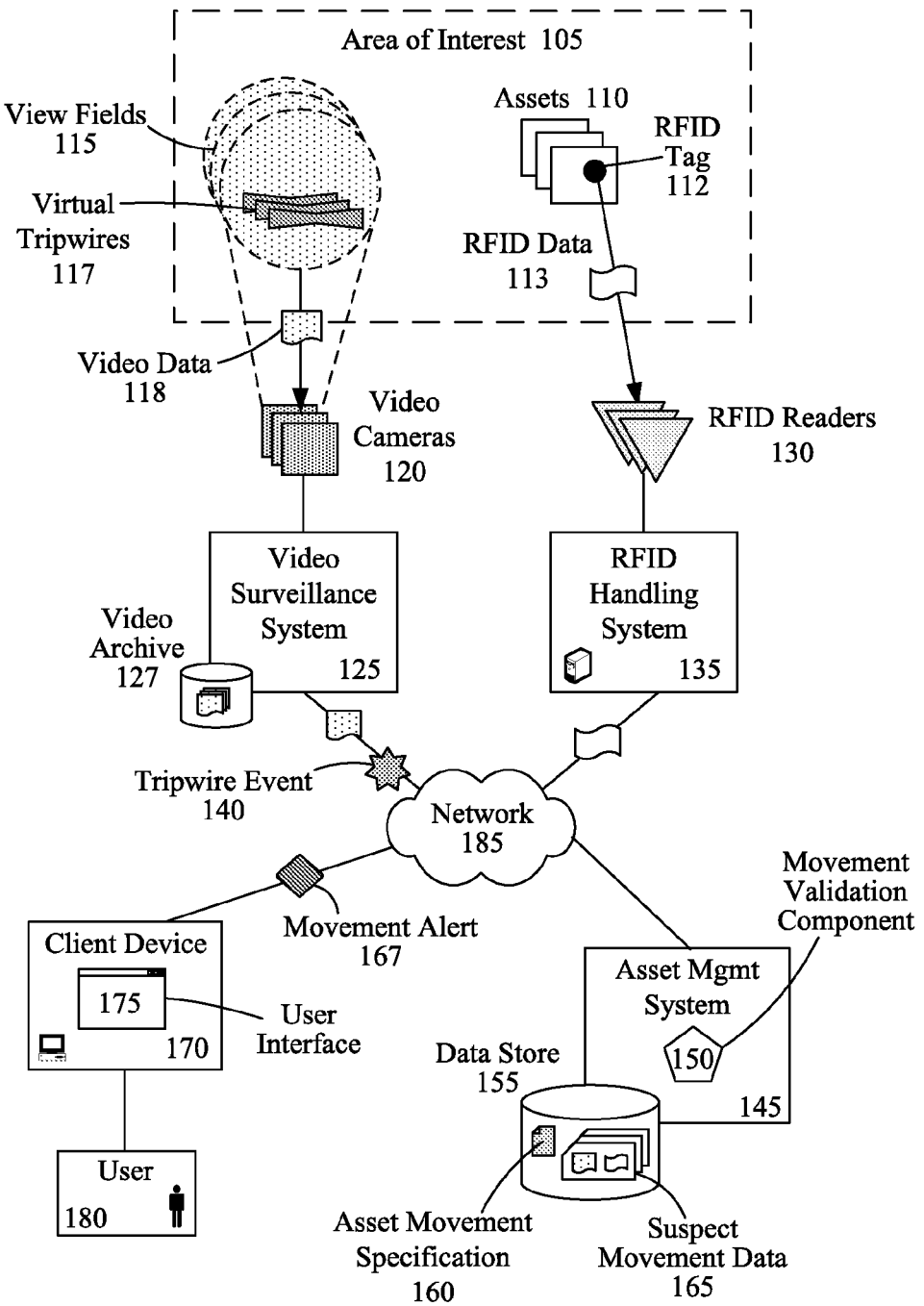
FIG. 1 is a schematic diagram illustrating a system that utilizes virtual tripwires to initiate the validation of the movement of an asset by an asset management system in accordance with embodiments of the inventive arrangements disclosed herein.

The present disclosure teaches a solution that for determining the validity of a RFID-identified asset's movement through a defined area of interest. A video surveillance system having video cameras for which virtual tripwires can be defined can detect asset movement through a virtual tripwire, triggering a tripwire event. The tripwire event can be sent to an asset management system having a movement validation component. The movement validation component can request the identifying RFID data for the asset from the RFID handling system. Using the RFID data and an asset movement specification, the movement validation component can determine validity of the asset's movement through the virtual tripwire. Data regarding invalid asset movements can be aggregated and stored as suspect movement data for later review.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that utilizes virtual tripwires 117 to initiate the validation of the movement of an asset 110 by an asset management system 145 in accordance with embodiments of the inventive arrangements disclosed herein. In system 100, data captured by a video surveillance system 125 and radio-frequency identification (RFID) handling system 135 can be conveyed over a network 185 for use by an asset management system 145 to validate the movements of assets 110 in a defined area of interest 105.

The area of interest 105 can represent a specific location along the path that the assets 110 travel as part of their processing. For example, the area of interest 105 can correspond to a portion of a production line where shipping boxes 110 are sorted into specific containers.

An asset 110 can represent a single unit (i.e., a part or a box of parts) that is being tracked by the asset management system 145. The assets 110 can be moved within the area of interest 105 by manual or automated means, or a combination thereof. A RFID tag 112 containing identifying RFID data 113 can be attached to each asset 110.

The video surveillance system 125 can represent a system that collects video data 118 from video cameras 120. Video data 118 captured by the video cameras 120 can be conveyed to a centralized server for storage in a video archive 127.

Each video camera 120 can be positioned to have a unique view field 115 within the area of interest 105. The portion of the area of interest 105 enclosed within the view field 115 of a video camera 120 can vary based on the operating parameters (i.e., magnification, focal point, resolution, etc.) and/or positioning of the video camera 120.

The video cameras 120 can be of the type having real-time analytic capabilities and can be configured to utilize virtual tripwires 117. A virtual tripwire 117 can represent a user-defined line drawn within the view field 115 of the video camera 120 using an associated software application (not shown) of the video surveillance system 125.

A virtual tripwire 117 can be used to mark a threshold within the view field 115 of the video camera 120 where passage of an asset 110 may indicate mishandling, a problem in the conveyance process, or another type of process error. For example, a virtual tripwire 117 can be drawn along a side of a conveyor belt in the view field 115 of a video camera 120. An asset 110 that falls off the side of the conveyor belt can break the virtual tripwire 117.

When the movement of an asset 110 passes through a virtual tripwire 117, the video surveillance system 125 can generate and send a tripwire event 140 to the asset management system 145. The tripwire event 140 can represent an electronic message containing pertinent information regarding the crossing of the virtual tripwire 117. Examples of information included in the tripwire event 140 can include, but are not limited to, an identifier of the video camera 120, location of the video camera 120, time at which the event occurred, video data 118 corresponding to the event, and the like.

The asset management system 145 can represent a computing system configured to record asset 110 movements. In addition to components used for asset 110 tracking, the asset management system 145 can include a movement validation component 150 and a data store 155 containing a asset movement specification 160 and suspect movement data 165. The movement validation component 150 can represent the software element of the asset management system 145 configured to determine the validity of asset 110 movements that cross virtual tripwires 117.

When the asset management system 145 receives a tripwire event 140 from the video surveillance system 125, the movement validation component 150 can be invoked. The movement validation component 150 can utilize the information contained in the tripwire event 140 to obtain the RFID data 113 for the suspect asset 110 (i.e., the asset 110 that crossed the virtual tripwire 117) from the RFID handling system 135.

The RFID handling system 135 can represent the components necessary to collect and/or process RFID data 113. The RFID handling system 135 can include multiple RFID readers 130 positioned around and/or within the area of interest 105 capable of reading the RFID tags 112 of the moving assets 110. Positioning of the RFID readers 130 can be such so as to limit cross-interference and/or the reading of multiple RFID tags 112.

The RFID handling system 135 can be further configured to compensate for invalid or incomplete readings of RFID tags 112 (i.e., retriggering the same RFID reader 130 or triggering a different RFID reader 130). The collection of RFID data 113 by the RFID handling system 135 can vary based upon implementation.

In one embodiment, the RFID handling system 135 can continuously collect RFID data 113 for assets 110. The collected RFID data 113 can be uniquely stored in a centralized data store (not shown). In such an embodiment, the movement validation component 150 can simply request the stored RFID data 113 that corresponds to the time and location of the video camera 120.

In another embodiment, the collection of RFID data 113 by the RFID handling system 135 can be on an "as needed" basis. In such an embodiment, the movement validation component 150 can trigger the RFID handling system 135 to collect RFID data 113 for the suspect asset 110. The collected RFID data 113 can be provided directly to the asset management system 145 without storage by the RFID handling system 135.

In yet another embodiment, the video surveillance system 125 and RFID handling system 135 can be integrated together as described in U.S. Pat. No. 6,998,987 B2. However, such an integrated video/RFID tracking system would require modification to utilize video cameras 120 having virtual tripwire 117 capabilities. In such an embodiment, the integrated video/RFID tracking system can provide the asset management system 145 with video data 118 of the asset 110 and its RFID data 113 in the tripwire event 140.

Once the movement validation component 150 receives the RFID data 113 for the suspect asset 110, the movement validation component 150 can determine the validity of the asset's 110 movement through the virtual tripwire 117. To make this determination, the movement validation component 150 can utilize the asset movement specification 160.

The asset movement specification 160 can represent pathing rules that correlate the identification information of an asset 110 and virtual tripwires 117 that the asset can or cannot move through. The pathing rules of the asset movement specification 160 can be written using BOOLEAN logic and/or regular expressions, such that an evaluation of a pathing rule as FALSE indicates an invalid movement of the asset 110.

For example, the asset movement specification 160 can define that any asset 110 cannot break a virtual tripwire 117 marking the side edge of a conveyor belt is invalid or suspect (* !=Tripwire A).

In another example, the asset movement specification 160 can state that only assets 110 identified as "electronics" are supposed to travel on a designated conveyor belt in a distribution center. In such an example, every asset 110 that crosses the virtual tripwire 117 for the designated conveyor belt would have its RFID data 113 evaluated for an "electronics" identifier.

When the movement of an asset 110 is determined as suspect, the movement validation component 150 can create suspect movement data 165 record. The suspect movement data 165 can include information pertinent to the suspect asset 110 and/or tripwire event 140.

As shown in this example, the suspect movement data 165 can include the RFID data 113 and video data 118 of the suspect asset 110. Additionally, the suspect movement data 165 can be configured to include metadata keywords, the tripwire event 140 data, and/or other pertinent data items.

Depending upon the contents of the tripwire event 140, the movement validation component 150 may need to request the video data 118 of the asset 110 movement from the video surveillance system 125 for inclusion in the suspect movement data 165. As such, the movement validation component 150 can be configured to request a segment of video data 118 that encompasses the asset's 110 movement through the virtual tripwire 117 (i.e., 5 seconds prior to passage through the virtual tripwire 117 and 10 seconds after). The movement validation component 150 can also be configured to request video data 118 from neighboring video cameras 120 for the same time period.

The movement validation component 150 can then generate and send a movement alert 167 to a designated user 180. The movement alert 167 can contain information regarding the suspect incident such as a portion of the suspect movement data 165, the entirety of the suspect movement data 165, or a uniform resource locator (URL) for the specific record of suspect movement data 165.

A user 180 can review suspect movement data 165 from a user interface 175 running on a client device 170. The client device 170 can represent a variety of computing devices capable of communicating with the asset management system 145 over network 185.

The user interface 175 can represent the interaction mechanism by which the user 180 can access the suspect movement data 165. User interface 175 can be an element or functional component of the standard user interface associated with the asset management system 145. Additionally, the user interface 175 can include software components necessary for viewing the video data 118 contained in the suspect movement data 165 record.

It is important to note that the functionality of the movement validation component 150 of the asset management system 145 does not propose corrective actions for asset 110 movements determined to be invalid or suspect. That is, determination of the validity of the asset's 110 pathway can be performed after the asset 110 has moved onto a suspect path. The suspect movement data 165 record created by the movement validation component 150 can provide the user 180 with a single data aggregate of pertinent information for review.

Network 185 can include any hardware/software/and firmware necessary to convey data encoded within carrier waves. Data can be contained within analog or digital signals and conveyed though data or voice channels. Network 185 can include local components and data pathways necessary for communications to be exchanged among computing device components and between integrated device components and peripheral devices. Network 185 can also include network equipment, such as routers, data lines, hubs, and intermediary servers which together form a data network, such as the Internet. Network 185 can also include circuit-based communication components and mobile communication components, such as telephony switches, modems, cellular communication towers, and the like. Network 185 can include line based and/or wireless communication pathways.

As used herein, presented data store 155 and archive 127 can be a physical or virtual storage space configured to store digital information. Data store 155 and archive 127 can be physically implemented within any type of hardware including, but not limited to, a magnetic disk, an optical disk, a semiconductor memory, a digitally encoded plastic memory, a holographic memory, or any other recording medium. Data store 155 and archive 127 can be stand-alone storage units as well as a storage unit formed from a plurality of physical devices. Additionally, information can be stored within data store 155 and archive 127 in a variety of manners. For example, information can be stored within a database structure or can be stored within one or more files of a file storage system, where each file may or may not be indexed for information searching purposes. Further, data store 155 and/or archive 127 can utilize one or more encryption mechanisms to protect stored information from unauthorized access.

Figure 2:
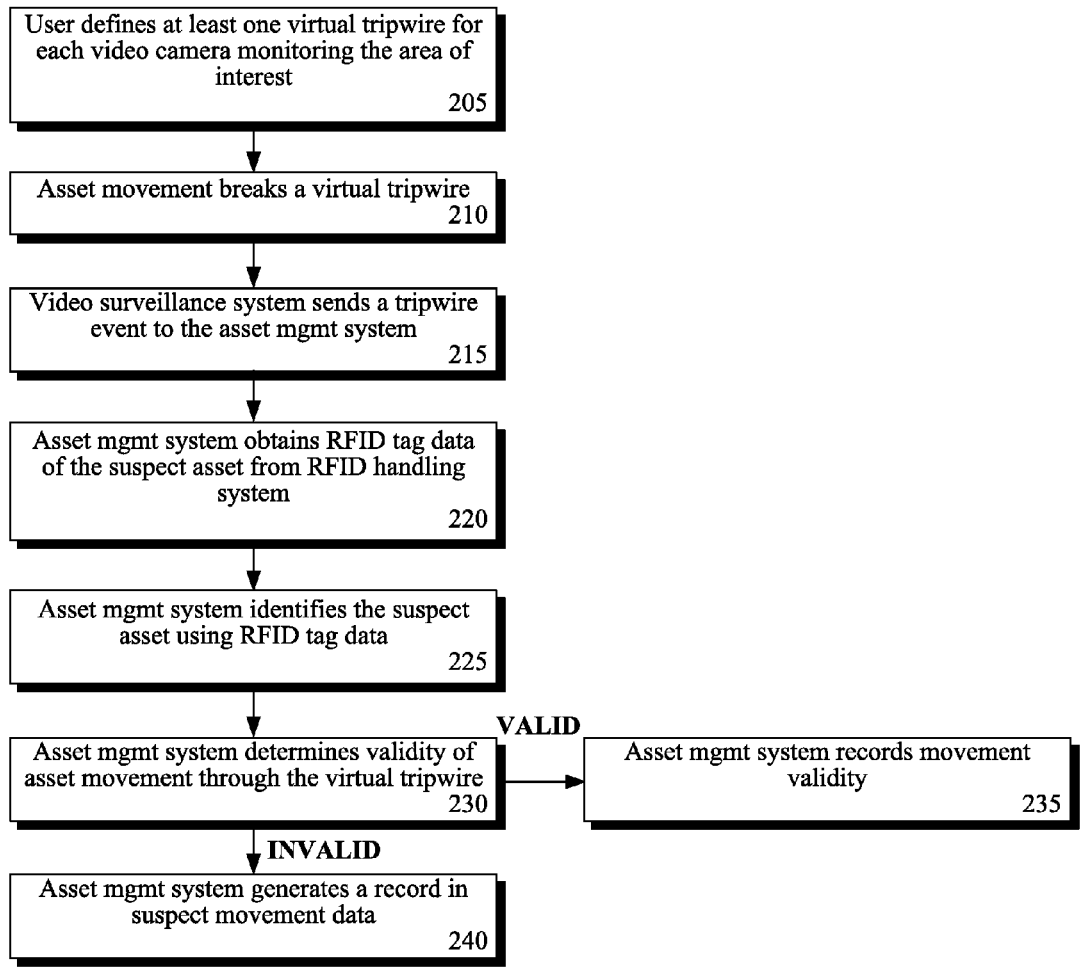
FIG. 2 is a flow chart of a method describing the general interaction between components when validating asset movements in accordance with an embodiment of the inventive arrangements disclosed herein.

FIG. 2 is a flow chart of a method 200 describing the general interaction between components when validating asset movements in accordance with embodiments of the inventive arrangements disclosed herein. Method 200 can be performed within the context of system 100 or any other system configured to utilize virtual tripwires and RFID data for validating asset movements.

Method 200 can begin in step 205 where a user can define at least one virtual tripwire for each video camera monitoring the area of interest. It should be noted that virtual tripwires should only be defined for video cameras whose view fields encompass a region of the area of interest where errors or problems are likely to occur.

For example, defining virtual tripwires for a video camera whose view field encompasses a divergence of the movement track (i.e., a single conveyor belt that splits into multiple conveyor belts) can provide better problem feedback regarding asset movement than defining a virtual tripwire for a video camera whose view field focuses on the display panel of a machine.

The movement of an asset within the area of interest can break a virtual tripwire in step 210. In step 215, the video surveillance system can send a tripwire event to the asset management system. The asset management system can obtain the RFID tag data of the suspect asset from the RFID handling system in step 220.

In step 225, the asset management system can identify the suspect asset based upon the obtained RFID tag data. The asset management system can determine the validity of the asset movement through the virtual tripwire in step 230.

When the asset's movement is determined to be valid, step 235 can execute where the asset management system can record that the asset's movement is valid. Step 235 can be performed as part of asset tracking in response to the tripwire event.

In another embodiment, the asset management system can simply perform no additional actions for step 235, since the asset has been determined to be on a valid path.

When the asset's movement is determined to be invalid, step 240 can execute where the asset management system generates a record in the suspect movement data.

Figure 3:
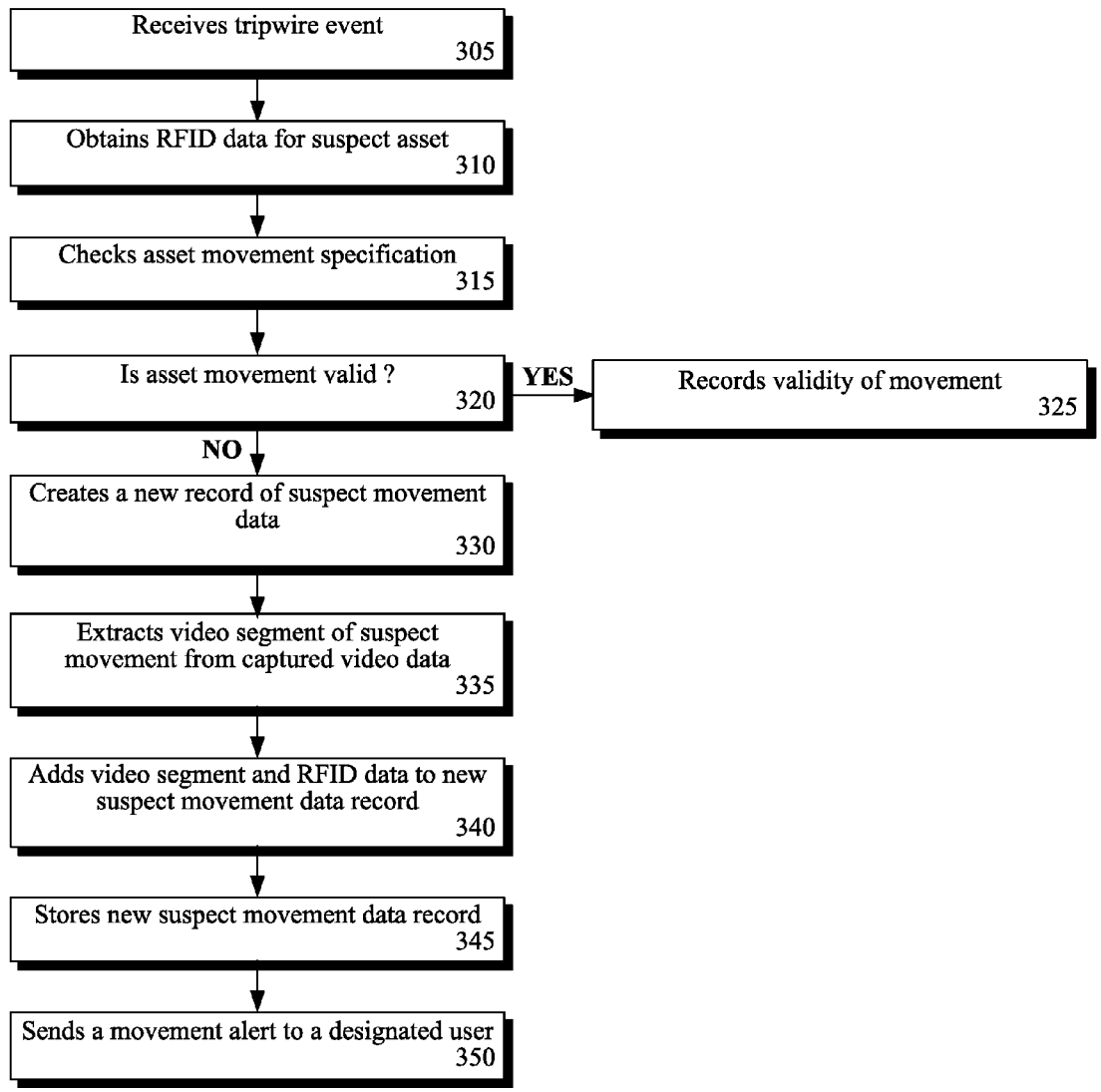
FIG. 3 is a flow chart of a method illustrating the operation of an asset management system utilizing a movement validation component in accordance with an embodiment of the inventive arrangements disclosed herein.

FIG. 3 is a flow chart of a method 300 illustrating the operation of an asset management system utilizing a movement validation component in accordance with embodiments of the inventive arrangements disclosed herein. Method 300 can be performed within the context of system 100 and/or method 200.

Method 300 can begin in step 305 where the asset management system can receive a tripwire event from the video surveillance system. RFID data for the suspect asset can be obtained in step 310. In step 315, the asset movement specification can be checked.

The validity of the asset movement can be determined in step 320. When the asset movement is determined to be valid, step 325 can execute where the validity of the movement can be recorded. Alternately, no additional actions can be performed in step 325, since the asset has been determined to be on a valid path.

When the asset movement is determined to be invalid, step 330 can execute where a new record of suspect movement data can be created. A video segment containing the suspect movement can be extracted from the captured video data in step 335.

In step 340, the extracted video segment and RFID data can be added to the new suspect movement data record. The new suspect movement data record can be stored in step 345. A movement alert can be sent to a designated user in step 350.

Figure 4:
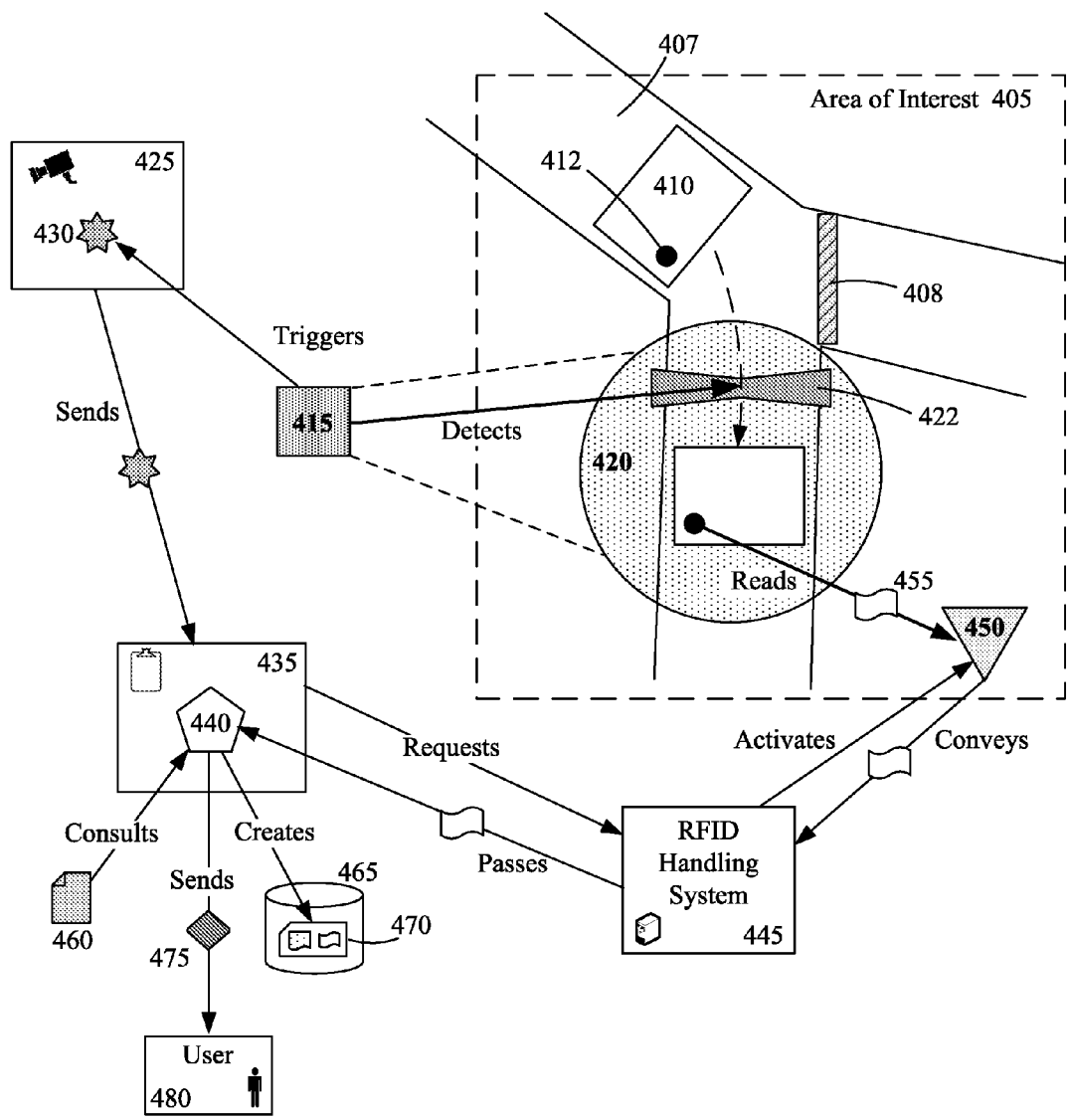
FIG. 4 is an illustrated process flow exemplifying the validation of asset movements using virtual tripwires and RFID identification with an asset management system in accordance with embodiments of the inventive arrangements disclosed herein.

FIG. 4 is an illustrated process flow 400 exemplifying the validation of asset 410 movements using virtual tripwires 422 and RFID identification with an asset management system 435 in accordance with embodiments of the inventive arrangements disclosed herein. Process flow 400 can be performed within the context of system 100 and/or in conjunction with methods 200 and/or 300.

Process flow 400 can illustrate an area of interest 405 that encompasses a Y-shaped intersection of a pathway 407 upon which assets 410 are conveyed. Pathway 407 can represent a variety of conveyance mechanisms including, but not limited to, conveyor belts, rollers, inclined planes, combinations thereof, and the like.

For example, area of interest 405 can correspond to a section of an automated shipping system where assets 410 are directed down a leg of the Y-intersection based upon one or more criteria, such as shipping location, contents, and/or shipping method.

Direction of an asset 410 can be performed manually (i.e., a worker pushes or places an asset 410 towards a specific leg of the intersection) or using an automated mechanism similar to the barrier 408 shown in this example. Such a barrier 408 can be used to prevent an asset 410 from utilizing a leg of the Y-intersection. Depending upon the mechanisms utilized by the pathway 407, the barrier 408 can change positions, manually or automatically, changing which leg of the Y-intersection assets 410 are directed down.

In this example, a video camera 415 can be positioned such that the view field 420 of the video camera 415 focuses upon the right leg of the Y-intersection. It should be noted that additional video cameras 415 can also simultaneously monitor the area of interest 405 and that the video camera 415 monitoring the right leg of the Y-intersection can be used in this example to represent the general operation of any of such video cameras 415.

Within the view field 420 of the video camera 415, a virtual tripwire 422 can be defined across the right leg of Y-intersection. Thus, any asset 410 traveling along the pathway 407 that is directed down the right leg of the Y-intersection can be seen within the view field 420 as passing through or breaking the virtual tripwire 422, as shown in this example by the dashed arrow indicating the asset's 410 movement.

The video camera 415 can, therefore, detect when the movement of an asset 410 breaks the virtual tripwire 422 in the view field 420. When an asset 410 breaks the virtual tripwire 422, the video camera 415 can trigger the video surveillance system 425 to generate a tripwire event 430. The video surveillance system 425 can then send the tripwire event 430 to the asset management system 435.

In this example embodiment, the asset management system 435 can then request RFID data 455 for the asset 410 from the RFID handling system 445. The RFID handling system 445 can activate a RFID reader 450 proximate to the asset 410, based upon the request sent by the asset management system 435.

For example, the tripwire event 430 can indicate that the triggering video camera 415 is at Location A. The RFID handling system 445 can include functionality to automatically determine which RFID reader 450 is closest to Location A.

The activated RFID reader 450 can then read the RFID data 455 from the RFID tag 412 attached to the asset 410 and convey the RFID data 455 to the RFID handling system 445, which passes the RFID data 455 to the asset management system 435. Alternately, depending upon the connectivity configuration of the RFID readers 450, RFID handling system 445, and asset management system 435, the RFID reader 450 can be configured to convey the RFID data 455 directly to the asset management system 435, bypassing the RFID handling system 445.

Once the asset management system 435 receives the RFID data 455 of the asset 410, the movement validation component 440 can consult the asset movement specification 460 to determine if travel down the right leg of the Y-intersection has been defined as valid or acceptable for the asset 410.

When the movement of the asset 410 is determined invalid, the movement validation component 440 can create a record of suspect movement data 470 within data store 465. The movement validation component 440 can then send a movement alert 475 to a designated user 480.

The user 480 can then review the suspect movement data 470 for this tripwire event 430 and also search the suspect movement data 470 for other similar incidences where this specific virtual tripwire 422 has been tripped. While this type of review process is not uncommon, it should be emphasized that conventional processes require the user 480 to aggregate the various data items pertaining to the incident.

As used herein, presented data store 465 can be a physical or virtual storage space configured to store digital information. Data store 465 can be physically implemented within any type of hardware including, but not limited to, a magnetic disk, an optical disk, a semiconductor memory, a digitally encoded plastic memory, a holographic memory, or any other recording medium. Data store 465 can be a stand-alone storage unit as well as a storage unit formed from a plurality of physical devices. Additionally, information can be stored within data store 465 in a variety of manners. For example, information can be stored within a database structure or can be stored within one or more files of a file storage system, where each file may or may not be indexed for information searching purposes. Further, data store 465 can utilize one or more encryption mechanisms to protect stored information from unauthorized access.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for validating asset movement comprising:
defining at least one virtual tripwire for at least one video camera of a video surveillance system that monitors a defined area of interest through which a plurality of assets are conveyed, wherein the at least one virtual tripwire visually defines a boundary within a view field of the at least one video camera, and wherein the plurality of assets are identified by an attached radio-frequency identification (RFID) tag;
detecting movement of an asset through a virtual tripwire by a video camera, wherein said movement of the asset through the virtual tripwire is considered as a potential misdirection;
notifying an asset management system of the detected potential misdirection of the asset, wherein said notification comprises at least a location of the video camera having detected the potential misdirection and a time of the detected movement;
obtaining RFID data for the detected asset by the asset management system from a RFID handling system, wherein said RFID handling system monitors the area of interest;
determining a validity of the movement of the asset through the virtual tripwire by the asset management system based upon the RFID data and an asset movement specification, wherein said asset movement specification defines pathing rules for the plurality of assets and virtual tripwires; and
when the movement of the asset is determined to be invalid, generating a record of suspect movement data to document the movement of the asset through the virtual tripwire, wherein obtaining RFID data for the asset further comprises:
requesting the RFID data from the RFID handling system, wherein said request comprises at least the location of the video camera having detected the potential misdirection;
determining of a RFID reader closest to the location of the video camera having detected the potential misdirection by the RFID handling system;
activating of the RFID reader determined to be closest to the video camera by the RFID handling system;
capturing of the RFID data contained within the RFID tag attached to the asset by the activated RFID reader; and
conveying the captured RFID data to the asset management system.

2. The method of claim 1, wherein notification of the asset management system further comprises:
generating of a tripwire event message by the video surveillance system; and
conveying the tripwire event message to the asset management system.

3. The method of claim 1, wherein obtaining RFID data for the asset further comprises:
wherein said request comprises the time of detected movement;
querying of a database of RFID data by the RFID handling system for a record corresponding to a time and location proximate to the time and location contained within the request from the asset management system; and
returning the RFID data of the queried record to the asset management system.

4. The method of claim 1, wherein the determination of the validity of the movement further comprises:
querying the asset movement specification for pathing rules containing at least one of an identifier of the asset and an identifier of the virtual tripwire, wherein said identifier of the asset is a data item contained within the RFID data for the asset, and, wherein the identifier of the virtual tripwire is associated with the location of the video camera;
evaluating each pathing rule found by querying the asset movement specification; and
when a pathing rule evaluates as FALSE, designating the movement of the asset as invalid.

5. The method of claim 4, wherein the querying of the asset movement specification, evaluation of pathing rules, and designation of the asset movement are performed by a movement validation component of the asset management system.

6. The method of claim 1, wherein generating of the suspect movement data further comprises:
creating a new record of suspect movement data;
aggregating incidence data comprising at least video data of the detected movement and the RFID data of the asset; and
storing said aggregated incidence data in the new record of suspect movement data.

7. The method of claim 6, wherein, when video data is omitted from the notification of the potential misdirection, the aggregating of incidence data further comprising:
requesting from the video surveillance system a segment of video data that corresponds to a time period encompassing the time of the detected movement, wherein said time period comprises a predefined amount of time before and after time of the detected movement.

8. The method of claim 1, further comprising:
when the detected movement of the asset is determined to be valid, recording of said validity of the detected movement by the asset management system in a data record associated with the asset.

9. The method of claim 1, further comprising:
sending of a movement alert to a designated human agent by the asset management system, wherein said movement alert comprises at least one of the record of suspect movement data, a uniform resource locator (URL) to the record of suspect movement data, and metrics pertaining to the detected movement through the virtual tripwire.

10. A system for validating asset movement comprising:
a plurality of assets identified by an attached radio-frequency identification (RFID) tag;
a video surveillance system having a plurality of video cameras that monitor a defined area of interest, wherein each video camera is capable of having at least one virtual tripwire defined in an associated view field, wherein the video surveillance system is configured to detect a movement of an asset through a virtual tripwire;
a RFID handling system having a plurality of RFID readers configured to capture RFID data from RFID tags that pass through the defined area of interest;
an asset movement specification defining a plurality of pathing rules for the plurality of assets and virtual tripwires associated with the plurality of video cameras, wherein the plurality of assets are referenced using the RFID data contained in the RFID tags; and
an asset management system configured to capture suspect movement data for asset movements through the defined area of interest deemed invalid with respect to the asset movement specification, wherein said suspect movement data comprises at least video data of the movement from the video surveillance system and RFID data collected by the RFID handling system, wherein the RFID data for the asset is captured by:

requesting the RFID data from the RFID handling system, wherein said request comprises at least the location of the video camera having detected the potential misdirection;

determining of a RFID reader closest to the location of the video camera having detected the potential misdirection by the RFID handling system;

activating of the RFID reader determined to be closest to the video camera by the RFID handling system;

capturing of the RFID data contained within the RFID tag attached to the asset by the activated RFID reader; and conveying the captured RFID data to the asset management system.

11. The system of claim 10, wherein the asset management system further comprises:
a movement validation component configured to determine a validity of the movement of the asset through the virtual tripwire based upon the RFID data of the asset and the asset movement specification.

12. The system of claim 10, wherein the asset movement specification is written using a standardized language capable of being evaluated as at least one of TRUE and FALSE.

13. The system of claim 12, wherein the standardized language comprises at least one of a BOOLEAN logic language, a regular expressions language, and an extensible markup language (XML).

14. The system of claim 10, wherein the asset management system is further configured to generate and send a movement alert message to a designated human agent, wherein said movement alert message provides the human agent access to the suspect movement data record.

15. A computer program product comprising
a computer storage hardware device having computer usable program code embodied therewith, the computer usable program code comprising:
computer usable program code configured to receive notification of a potential misdirection of an asset through a defined area of interest from a video surveillance system, wherein said potential misdirection represents a movement of the asset through a virtual tripwire associated with a video camera that monitors the defined area of interest, wherein said notification comprises at least a location of the video camera having detected the potential misdirection and a time of the detected movement;
computer usable program code configured to obtain RFID data for the asset from a RFID handling system, wherein said RFID handling system monitors the defined area of interest;
computer usable program code configured to determine a validity of the movement of the asset through the virtual tripwire based upon the RFID data and an asset movement specification, wherein said asset movement specification defines pathing rules for assets and virtual tripwires; and
computer usable program code configured to, when the movement of the asset is determined to be invalid, generate a record of suspect movement data to document the movement of the asset through the virtual tripwire, wherein the RFID data for the asset is obtained by:

requesting the RFID data from the RFID handling system, wherein said request comprises at least the location of the video camera having detected the potential misdirection;

determining of a RFID reader closest to the location of the video camera having detected the potential misdirection by the RFID handling system;

activating of the RFID reader determined to be closest to the video camera by the RFID handling system;

capturing of the RFID data contained within the RFID tag attached to the asset by the activated RFID reader; and conveying the captured RFID data to the asset management system.

16. The computer program product of claim 15, wherein the determination of the validity of the movement further comprises:
computer usable program code configured to query the asset movement specification for pathing rules containing at least one of an identifier of the asset and an identifier of the virtual tripwire, wherein said identifier of the asset is a data item contained within the RFID data for the asset, and, wherein the identifier of the virtual tripwire is associated with the location of the video camera;
computer usable program code configured to evaluate each pathing rule found by querying the asset movement specification; and
computer usable program code configured to, when a pathing rule evaluates as FALSE, designate the movement of the asset as invalid.

17. The computer program product of claim 15, wherein generating of the suspect movement data further comprises:
computer usable program code configured to create a new record of suspect movement data;
computer usable program code configured to aggregate incidence data comprising at least video data of the detected movement and the RFID data of the asset; and
computer usable program code configured to store said aggregated incidence data in the new record of suspect movement data.

18. The computer program product of claim 17, wherein, when video data is omitted from the notification of the potential misdirection, the aggregating of incidence data further comprising:
computer usable program code configured to request from the video surveillance system a segment of video data that corresponds to a time period encompassing the time of the detected movement, wherein said time period comprises a predefined amount of time before and after time of the detected movement.

19. The computer program product of claim 15, further comprising:
computer usable program code configured to send a movement alert to a designated human agent, wherein said movement alert comprises at least one of the record of suspect movement data, a uniform resource locator (URL) to the record of suspect movement data, and metrics pertaining to the detected movement through the virtual tripwire.

* * * * *